B. T. BABBITT.
Wind-Motor.
No. 219,895. Patented Sept. 23, 1879.
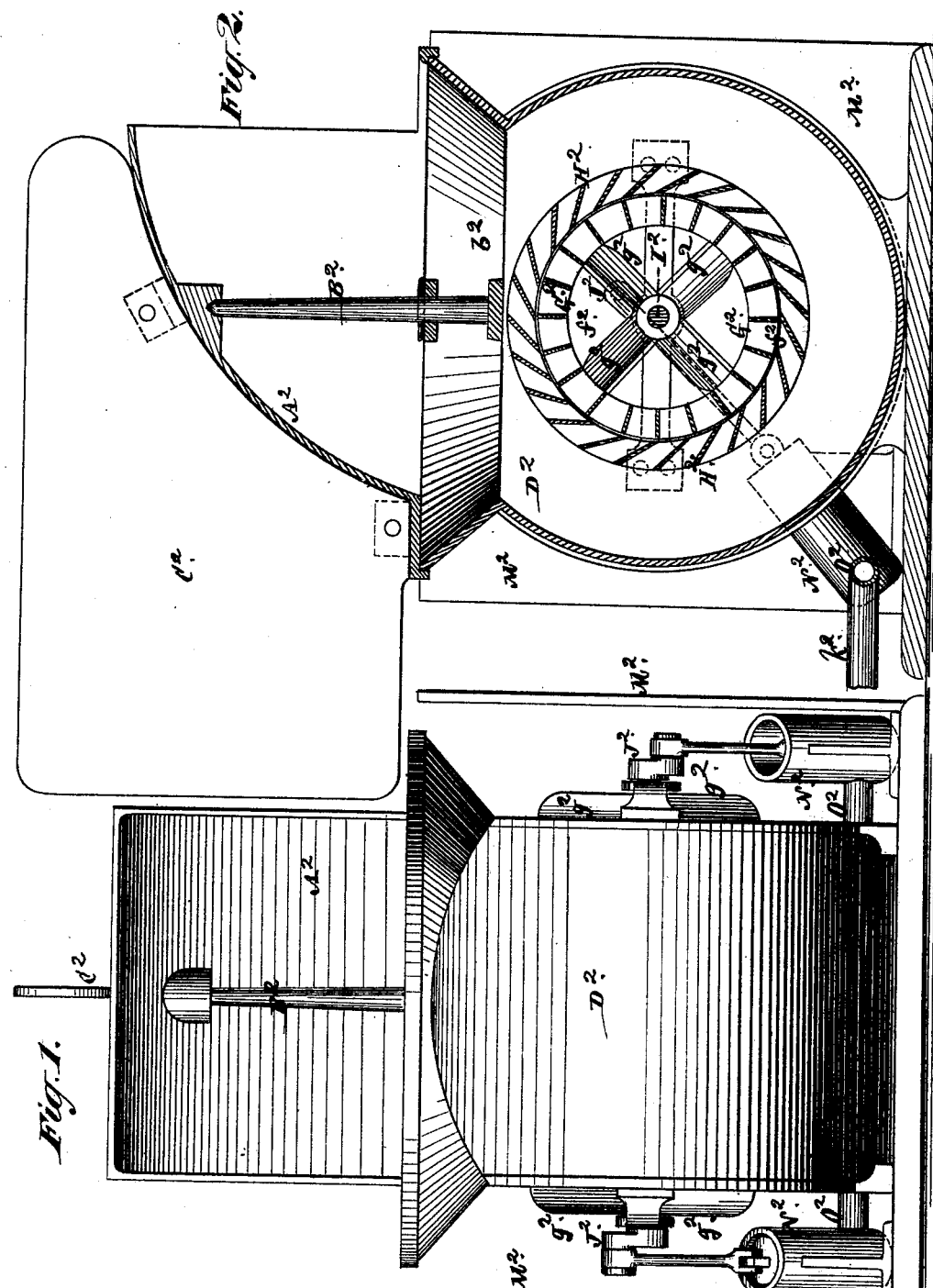
Witnesses
Inventor

UNITED STATES PATENT OFFICE.

BENJAMIN T. BABBITT, OF NEW YORK, N. Y.

IMPROVEMENT IN WIND-MOTORS.

Specification forming part of Letters Patent No. 219,895, dated September 23, 1879; application filed March 12, 1879.

*To all whom it may concern:*

Be it known that I, BENJAMIN T. BABBITT, of the city and State of New York, have invented certain Improvements in Wind-Motors for Compressing Air, and for other purposes, of which the following is a full, clear, and exact description, reference being had to the accompanying drawings, forming part of this specification.

This invention more particularly relates to apparatus for storing power by compressing air through the agency of the wind.

The invention consists in a combination of a rotating cowl capable of self-adjustment to the wind, a stationary wind chest or chamber in open communication with said cowl to receive the wind as conducted by the latter, a rotating wind or bucket wheel within said chamber, and a series of stationary deflectors inclosing said wheel to direct the wind on to the buckets of the latter.

The invention also consists in a combination of a rotating cowl capable of self-adjustment to the wind, a stationary wind-chamber having an inlet-aperture for conducting the wind to it from the cowl and one or more exhaust-outlets in its sides or ends, a wind or bucket wheel arranged to freely rotate within said chamber, a series of stationary deflectors for directing the wind onto the buckets of the wheel, a rotating-wheel shaft opposite end cranks on said shaft, and air-compressing pumps having their pistons or plungers driven by said cranks.

In the accompanying drawings, Figure 1 represents an end elevation of an apparatus constructed in accordance with the invention, and Fig. 2 a central vertical section of the same in a plane at right angles to Fig. 1.

$A^2$ is a rotating cowl provided with a vane, $C^2$, to make it self-adjusting to the wind upon and around a stationary upright shaft, $B^2$, which is erected on a lower stationary wind chest or chamber, $D^2$, preferably of cylindrical, or nearly cylindrical, construction, with its longitudinal axis in a horizontal or approximately horizontal position. Said cowl has a wide or flaring mouth, but is of a close curved form at its top and back to conduct the wind or air, as it is received by the cowl, down through an inlet-opening, $b^2$, into the wind-chamber $D^2$.

Arranged to freely rotate within the said chamber $D^2$ is a wind or bucket wheel, $G^2$, the axis of which is also preferably horizontal, but might be otherwise arranged. This bucket-wheel is surrounded by a circular series of deflectors, $H^2$, for directing the wind or air, as it is received and collected within the cowl and wind-chamber $D^2$, beneath, onto, or against the buckets of the wheel, all around the latter, said deflectors being attached to the wind-chambers $D^2$ and stationary in relation with the bucket-wheel.

Apertures $f^2$ in the sides or ends of the wind-chamber $D^2$ form exhaust-outlets for the wind after it has performed its duty on the buckets of the wheel and on beveled or oblique arms or vanes $g^2$ attached to the ends of the wheel and arranged to rotate within the exhaust-outlets $f^2$ to more fully utilize the force of the wind.

This construction of wind-motor, irrespective of the arrangement of the bucket-wheel and stationary deflectors within the stationary wind-chamber $D^2$ and rotating cowl arranged to conduct the wind to said chamber, is not here separately claimed as new, the same being the subject of a separate application by me for Letters Patent filed simultaneously with this.

$I^2$ is the rotating shaft of the bucket-wheel, having cranks $J^2$, preferably of opposite throw on its ends, and serving to give reciprocating motion to the pistons or plungers of two air-compressing pumps, $N^2$ $N^2$, which, in common with the wind-chamber $D^2$, have a fixed relation to the cowl, but are stationary and may be firmly secured on the base which carries the wind-chamber $D^2$. A discharge-pipe, $O^2$, common to both pumps and having a general outlet-branch, $k^2$, serves to conduct the compressed air furnished by the pumps to a reservoir to be utilized as required.

In this apparatus it will be seen that neither the chamber containing the wind or bucket wheels, nor the pumps, are rotated with the cowl.

To prevent the wind when blowing in certain directions from entering from the outside, the exhaust-apertures $f^2$, and so choking the exhaust, screens or guards $M^2$ are erected outside of said outlets and at suitable distances therefrom to shield said apertures against outside ingress of air, and to prevent interference by the wind from the outside with the spent wind or air passing from the inside of the chamber $D^2$ to the outside thereof.

I claim—

1. The combination of a rotating cowl capable of self-adjustment to the wind, and a stationary wind chest or chamber in open communication with said cowl mounted on said chamber, a rotating wind or bucket wheel within said chamber, and a series of stationary deflectors inclosing said wheel, substantially as specified.

2. The combination of the rotating cowl $A^2$, the stationary wind-chamber $D^2$, having an inlet-aperture, $b^2$, establishing communication between said cowl and said chamber, and one or more exhaust-outlets, $f^2$, in its sides or ends, the wind or bucket wheel $G^2$ arranged to freely rotate within said chamber, and the stationary deflectors $H^2$, the wheel-shaft $I^2$, the cranks $J^2$, and the air-compressing pumps $N^2$ $N^2$, essentially as shown and described.

B. T. BABBITT.

Witnesses:
T. J. KEANE,
FREDK. HAYNES.